Nov. 17, 1925.
H. M. SARDONELL
1,561,570
AUTOMOBILE LENS
Filed Feb. 28, 1925
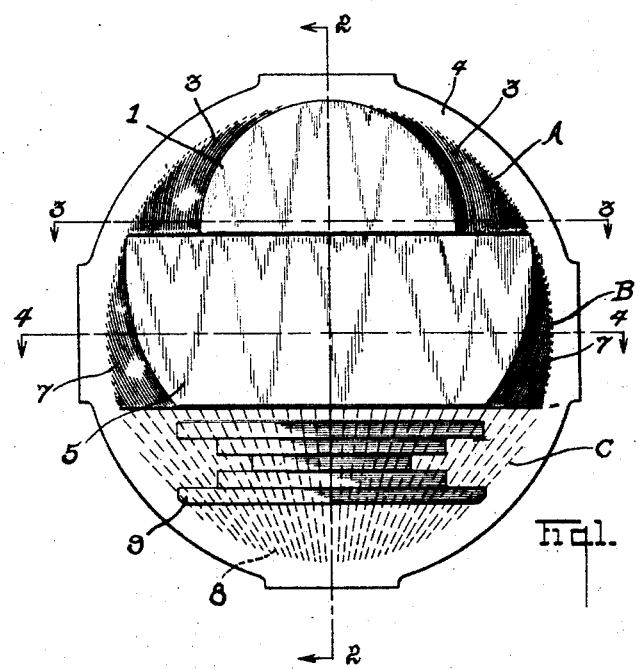
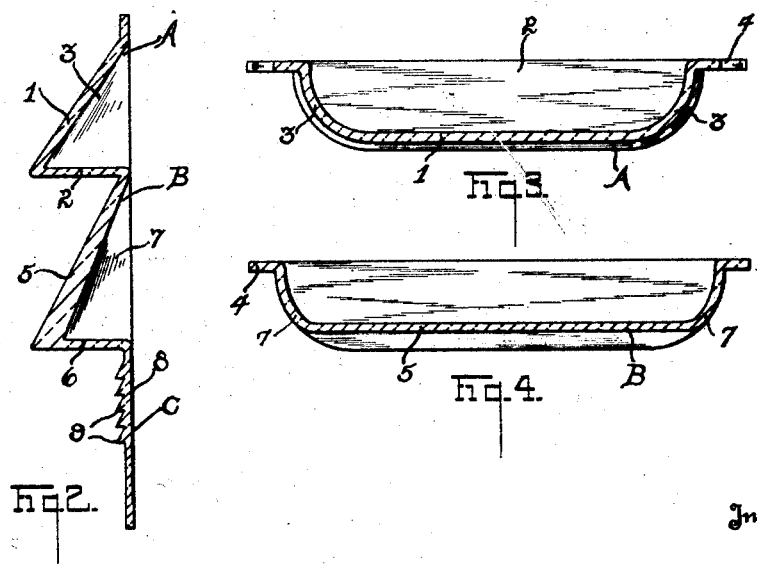
Inventor
Harry M. Sardonell
By Owen, Owen & Crampton
Attorney Patented Nov. 17, 1925.

1,561,570

UNITED STATES PATENT OFFICE.

HARRY M. SARDONELL, OF DETROIT, MICHIGAN.

AUTOMOBILE LENS.

Application filed February 28, 1925. Serial No. 12,239.

*To all whom it may concern:*

Be it known that I, HARRY M. SARDONELL, a citizen of the United States, and a resident of Detroit, in the county of Wayne and State of Michigan, have invented a new and useful Automobile Lens, which invention is fully set forth in the following specification.

This invention relates to lenses particularly adapted for use on automobiles or other vehicles.

Objects of the invention are to provide a lens which refracts the light rays downwardly from the horizontal so as clearly to illuminate the road surface in front of a vehicle for a sufficient distance and on the sides thereof without directing the rays blindingly toward approaching vehicles; and to provide a lens having the new and improved features of construction and arrangement hereinafter described.

For purposes of illustration one embodiment of the invention is shown in the accompanying drawings, in which,—

Figure 1 is a front face view of the lens; Fig. 2 is a section on the line 2—2 of Fig. 1; Fig. 3 is a section on the line 3—3 of Fig. 1, and Fig. 4 is a section on the line 4—4 of Fig. 1.

The illustrated embodiment of the invention comprises a glass lens which may be of substantially circular conformation or of any other desired form according to the shape of the holder to which it is attached, and such lens may be stamped in a mold in any usual or preferred manner. Generally the lens may be said to consist of three integral portions or sections, viz., an upper section A for purposes of convenience termed the indicating section; an intermediate section B termed the distant illuminating section, and a lower section C termed the near illuminating section. The several sections cooperate not only efficiently and adequately to illuminate all portions of the road surface in front of the vehicle, but also to constitute an effective warning or danger signal to vehicles and pedestrians approaching in front of or from either side of the vehicle. An outstanding characteristic of the construction and arrangement residing in the fact that the blinding glare inherent in the ordinary lenses, of which I am aware, at present in use is eliminated thereby reducing to a minimum the liability of accidents and casualties.

The upper or indicating section A comprises an outwardly inclined projecting plate 1 of semi-circular form and integrally jointd to the lower end of the projecting surface 1 and extending inwardly to the plane of the lens is a shelf or bottom wall 2. As indicated in Fig. 2, the thickness of the plate 1 and shelf 2 is approximately equal, so that the refractory powers of the two are practically the same. Integral with the opposite side or end portions of the plate 1 are inwardly and outwardly curved plates 3 which are integrally joined to the lens rim 4.

The projecting plate 1, shelf 2, and deflectors 3 are preferably colored and the inside thereof is frosted as by sand blasting, so that there is no blinding glare when looking at the warning section A from the front or sides of the lens, but on the other hand the light is materially dimmed, although the thickness of the glass is sufficient to enable the light rays to be seen from a considerable distance. The inclined plate 1 allows the rays to pass in their ordinary course and the curved portions 3 enable pedestrians and other vehicles on opposite sides of the lens to receive warning of the approach of the vehicle.

The indicating section A may be colored in any desired manner or by translucent enamel, but preferably this portion of the lens on the right-hand side of the vehicle (facing the vehicle) is colored red, while on the left-hand side of the vehicle the corresponding portion is colored green, thus visibly to indicate to other vehicles and pedestrians which, if either, light is extinguished.

The intermediate or distant illuminating section B comprises a downwardly and outwardly projecting plate 5, which is integrally joined at its upper portion to the inner end of the shelf 2 and at its lower end to a shelf 6, which also extends rearwardly to the plane of the lens. The plate 5 is of transparent glass and is not of uniform thickness throughout, but as indicated in Fig. 2, progressively increases in thickness from its upper end portion to its lower portion where the thickness is the greatest. It will be apparent that the light rays passing through the plate 5 are refracted downwardly. Integrally joining the outer end portions of the plate 5 are inwardly and outwardly curved deflectors 7, and as indicated in Fig. 1, these deflectors are wider at the lower portion than at the upper portion, so that the greater side illuminating area is located nearer the lower end portion of the lens.

The lower or near illuminating section C is also made of transparent glass, and the rear surface thereof is provided with a plurality of closely spaced grooves 8 which diverge upwardly and outwardly from the lower portion of the lens so that light rays passing through this section are scattered in lateral directions thus clearly illuminating the road surface directly in front and at the sides of the lens. Formed on the front surface of this section are a plurality of transverse bars or prisms 9, in this instance 5 in number, and the outer prisms are shown considerably longer than the center prism, and the intermediate prisms being of a length between the shortest and longest prism. The front faces of the prisms 9 project outwardly and downwardly from the plane of the lens and the under surfaces thereof extend at substantially right angles to the plane of the lens. It will be apparent that the light rays passing through the prisms 9 are refracted downwardly in such a manner as to illuminate the road surface directly in front of the lens to aid the driver in the efficient operation of the vehicle.

From the above it will be seen that I have shown and described a lens which admirably fulfills the objects enumerated, but it is to be understood that the above description is illustrative and not limiting and that numerous changes in details of construction and arrangement may be effected without departing from the spirit of the invention especially as defined in the appended claim.

What I claim is:

A lens having three integral sections, a plurality of transverse prisms on one section whose front faces are arranged to refract downwardly all rays passing therethrough and whose under faces are disposed substantially perpendicular to the plane of the lens, there being grooves on the opposite face of said section arranged to refract the rays in lateral diverging directions, another section having an outwardly and downwardly inclined projecting flat portion, and inwardly curved integral side portions on opposite sides of said projecting portion, said flat portion and inwardly curved portions being colored and rendered translucent, and the third section having an outwardly inclined projecting portion and a flat transverse bottom portion, the opposite face thereof being hollow and conforming to the shape of the projecting portion, and integral outwardly and inwardly curved side portions on said projecting portion.

In testimony whereof, I have hereunto signed my name to this specification.

HARRY M. SARDONELL.